(12) United States Patent
Marchal et al.

(10) Patent No.: US 10,288,210 B2
(45) Date of Patent: May 14, 2019

(54) PIPE SECTION

(71) Applicant: Majus Limited, London (GB)

(72) Inventors: Philippe Marchal, Vaucresson (FR); Jean Damour, Paris (FR); Pierre Ollier, Boulogne-Billancourt (FR)

(73) Assignee: Majus Limited, London (GB)

( * ) Notice: Subject to any disclaimer, the term of this patent is extended or adjusted under 35 U.S.C. 154(b) by 649 days.

(21) Appl. No.: 14/879,464

(22) Filed: Oct. 9, 2015

(65) Prior Publication Data

US 2016/0109053 A1 Apr. 21, 2016

(51) Int. Cl.
| | |
|---|---|
| *F16L 59/14* | (2006.01) |
| *F16L 59/18* | (2006.01) |
| *F16L 9/18* | (2006.01) |
| *F16L 25/00* | (2006.01) |
| *F16L 39/00* | (2006.01) |
| *F16L 15/00* | (2006.01) |

(52) U.S. Cl.
CPC ............. *F16L 59/14* (2013.01); *F16L 9/18* (2013.01); *F16L 25/0018* (2013.01); *F16L 39/005* (2013.01); *F16L 59/18* (2013.01); *F16L 59/182* (2013.01); *F16L 15/006* (2013.01)

(58) Field of Classification Search
CPC ....... F16L 59/14; F16L 15/006; F16L 39/005; F16L 9/18
USPC .............................. 285/55, 123.3, 123.4, 904
See application file for complete search history.

(56) References Cited

U.S. PATENT DOCUMENTS

| | | | | |
|---|---|---|---|---|
| 1,346,687 | A | * 7/1920 | Mason | F16L 13/113 |
| | | | | 285/288.1 |
| 2,943,387 | A | * 7/1960 | Dawson | F16L 13/0263 |
| | | | | 285/288.1 |
| 3,794,358 | A | * 2/1974 | Allen | E21B 33/10 |
| | | | | 285/123.1 |
| 3,885,595 | A | 5/1975 | Gibson et al. | |

(Continued)

FOREIGN PATENT DOCUMENTS

| | | |
|---|---|---|
| CN | 102927378 | 2/2013 |
| EP | 0071551 | 2/1983 |

(Continued)

OTHER PUBLICATIONS

European Search Report for EP Application No. 15 19 0299.6 dated Mar. 11, 2016.

*Primary Examiner* — David Bochna
(74) *Attorney, Agent, or Firm* — McDonnell Boehnen Hulbert & Berghoff LLP (57) ABSTRACT

A thermally insulated pipe for transporting fluids, being connectable to at least one further pipe, is disclosed herein. The pipe comprises an outer pipe wall and an inner pipe wall substantially parallel to the outer pipe wall and configured to contain a fluid within the pipe. The inner pipe wall comprises a body portion and a connection portion extending therefrom, a thermal insulation layer provided between the outer pipe wall and the body portion of the inner pipe wall, and at least one male joinable end. The male joinable end comprises the connection portion of the inner pipe wall which terminates in a connection component adapted to engage a connection component of a further pipe, and a transition region where the outer pipe wall tapers continuously inwardly to meet the connection portion of the inner pipe wall.

6 Claims, 4 Drawing Sheets

(56) References Cited

U.S. PATENT DOCUMENTS

| | | | | |
|---|---|---|---|---|
| 3,988,029 | A * | 10/1976 | Gibson | F16L 39/005 285/904 |
| 4,011,732 | A * | 3/1977 | Doherty | F16L 39/005 285/904 |
| 4,341,392 | A * | 7/1982 | van Dongeren | F16L 9/18 285/123.16 |
| 4,415,184 | A * | 11/1983 | Stephenson | E21B 17/00 138/149 |
| 4,491,347 | A * | 1/1985 | Gustafson | F16L 59/141 285/904 |
| 5,935,517 | A * | 8/1999 | Roll | F16L 59/14 138/148 |
| 6,142,359 | A * | 11/2000 | Corbishley | F16L 13/02 228/104 |
| 6,231,086 | B1 * | 5/2001 | Tierling | F16L 9/18 285/288.1 |
| 7,100,946 | B2 * | 9/2006 | Giacomelli | F16L 1/20 285/288.1 |
| 7,137,651 | B2 * | 11/2006 | Bonn | F16L 59/141 285/904 |
| 7,399,002 | B2 * | 7/2008 | Motew | F16L 59/141 285/904 |
| 7,530,371 | B2 * | 5/2009 | Hickman | F16L 59/022 285/47 |
| 7,722,088 | B2 * | 5/2010 | Pionetti | F16L 39/005 285/123.3 |
| 8,061,739 | B2 | 11/2011 | Marchal | |
| 8,555,930 | B2 * | 10/2013 | Pionetti | F16L 1/18 138/109 |
| 2001/0012476 | A1 * | 8/2001 | Louis | F16L 9/18 138/113 |
| 2004/0178626 | A1 * | 9/2004 | Segreto | F16L 59/18 285/47 |
| 2008/0149210 | A1 * | 6/2008 | Pionetti | F16L 9/18 285/288.1 |
| 2008/0265573 | A1 * | 10/2008 | Holdren | B23K 9/0284 285/288.1 |
| 2009/0096208 | A1 * | 4/2009 | Marchal | F16L 39/005 285/52 |
| 2010/0230953 | A1 * | 9/2010 | Baylot | F16L 9/18 285/288.1 |

FOREIGN PATENT DOCUMENTS

| | | |
|---|---|---|
| GB | 2161565 | 1/1986 |
| GB | 2498740 | 7/2013 |
| WO | WO0073696 | 12/2000 |

* cited by examiner

PIPE SECTION

This invention relates to pipes, in particular a thermally insulated pipe for transporting fluids or to protect the integrity of a well.

BACKGROUND

Pipes used to transport fluids in wells sometimes need to be well insulated to ensure the fluid remains above a certain temperature without need for further heating. When the fluid is a liquid, high temperatures may be useful, as high temperature liquids may have a lower viscosity than lower temperature liquids. The necessary insulation is typically provided in double-walled pipes having an inner tube section, an outer tube section, and a thermal insulation layer provided between the inner tube section and the outer tube section. Such pipes are generally referred as pipe-in-pipe insulated tubings.

Some other pipes are used as casings to ensure the well integrity. In such a case, insulated pipe-in-pipe casings could be used to avoid heat exchange between the fluid flowing in the tubing and the ground. For instance, in order to avoid permafrost melting.

When it is required to transport the fluid from within the ground to the surface, the objective of insulated tubings is typically to avoid wax or hydrates formation or to protect the well integrity from temperature increases which may cause permafrost melting or annular pressure build up. When it is required to transport steam from the surface to downhole, the objective is to ensure the highest steam quality downhole. For manufacturing, transport and logistical reasons, pipes are typically manufactured in sections, and then joined together by screwing to form longer pipe sections as required.

U.S. Pat. No. 8,061,739 B2 discloses a thermal insulation device of a screwed junction between two sections of pipe.

The present disclosure seeks to provide an alternative to pipes or pipe junctions of the prior art.

BRIEF SUMMARY OF THE DISCLOSURE

In accordance with the present inventions there is provided a thermally insulated pipe for transporting fluids, being connectable to at least one further pipe. The pipe comprises an outer pipe wall and an inner pipe wall substantially parallel to the outer pipe wall and configured to contain a fluid within the pipe. The inner pipe wall comprises a body portion and a connection portion extending therefrom, a thermal insulation layer provided between the outer pipe wall and the body portion of the inner pipe wall, and at least one male joinable end. The male joinable end comprises the connection portion of the inner pipe wall which terminates in a connection component adapted to engage a connection component of a further pipe, and a transition region where the outer pipe wall tapers continuously inwardly to meet the connection portion of the inner pipe wall.

Thus, there is provided a pipe with a male joinable end that tapers continuously inwardly from the outer pipe wall to meet the connection portion of the inner pipe wall. Such a pipe has low manufacturing costs whilst providing an efficient thermal connection. The connection component may be adapted to engage the connection component of the further pipe using a screwed connection.

The outer pipe wall may taper inwardly at an angle of between 5 degrees and 20 degrees. Thus, the outer pipe wall tapers inwardly at an angle which results in a thermally efficient pipe junction. The outer pipe wall may be connected to the connection portion of the inner pipe wall by a weld. Advantageously, an angle of between 5 degrees and 20 degrees ensures a strong weld is formed between the outer pipe wall and the connection portion of the inner pipe wall. Good penetration of the weld material into the joint is important for a strong weld. In addition, a bend in the outer pipe wall will modify the material properties. An angle of taper between 5 degrees and 20 degrees ensures the material properties are not modified so much as to endanger the integrity of the outer pipe wall at the point of taper.

The outer pipe wall may taper inwardly over a distance of between 0.1 and 1 meter.

In accordance with another aspect of the present inventions, there is provided a thermally insulated pipe junction connecting a first pipe having a male joinable end and a second pipe having a female joinable end. The first pipe comprises a first outer pipe wall, a first inner pipe wall substantially parallel to the outer pipe wall and configured to contain a fluid within the pipe. The first inner pipe wall comprises a first body portion and a first connection portion extending therefrom, a first thermal insulation layer provided between the first outer pipe wall and the first body portion. The male joinable end comprises the first connection portion which terminates in a first connection component, and a transition region where the first outer pipe wall tapers inwardly to meet the connection portion of inner pipe wall. The second pipe comprises a second outer pipe wall, a second inner pipe wall substantially parallel to the second outer pipe wall and configured to contain a fluid within the pipe. The second inner pipe wall comprises a second body portion and a second connection portion extending therefrom, a second thermal insulation layer provided between the second outer pipe wall and the second body portion. The female joinable end comprises the second connection portion which terminates in a second connection component engaging the first connection component, and an intermediate surface connecting the second inner pipe wall to the second outer pipe wall such that both the second outer pipe wall and the intermediate surface extend over the second connection component, wherein, the intermediate surface extends over at least a part of the first connection portion and wherein any of the outer pipe wall of the transition region extending within the intermediate surface is tapered continuously up to the first connection portion.

Thus, no part of the transition region substantially parallel to the inner pipe wall extends within the intermediate surface. Thus, once the transition region extends within the intermediate surface, the outer pipe wall of the transition region remains tapering all the way up to the first connection portion. This provides a pipe junction with low fabrication costs whilst maintaining good thermal efficiency.

The first connection component may be adapted to engage the second connection component using a screwed connection.

In accordance with a further aspect of the present inventions, there is provided a thermally insulated pipe junction connecting a first pipe having a male joinable end and a second pipe having a female joinable end. The first pipe comprises a first outer pipe wall, a first inner pipe wall substantially parallel to the outer pipe wall and configured to contain a fluid within the pipe. The first inner pipe wall comprises a first body portion and a first connection portion extending therefrom, a first thermal insulation layer provided between the first outer pipe wall and the first body portion. The male joinable end comprises the first connection portion which terminates in a first connection component, and a transition region where the first outer pipe wall narrows in a stepped manner to meet the first connection portion. The outer pipe wall of the transition region comprises a proximal tapered section, a distal tapered section and an intervening section therebetween, the intervening section being substantially parallel to the first inner pipe wall. The second pipe comprises a second outer pipe wall, a second inner pipe wall substantially parallel to the second outer pipe wall and configured to contain a fluid within the pipe. The second inner pipe wall comprises a second body portion and a second connection portion extending therefrom, a second thermal insulation layer provided between the second outer pipe wall and the second body portion. The female joinable end comprises the second connection portion which terminates in a second connection engaging the first connection component, and an intermediate surface connecting the second inner pipe wall to the second outer pipe wall such that both the second outer pipe wall and the intermediate surface extend over the second connection component, wherein the perpendicular distance between the intermediate surface and the second inner pipe wall is less than the perpendicular distance between the intervening section of the first outer pipe wall and the first connection portion.

Thus, a thermally insulated pipe junction is provided where the intervening section cannot fit within the intermediate surface. This provides a pipe junction with lower fabrication costs whilst maintaining good thermal efficiency.

The first connection component may be adapted to engage the second connection component using a screwed connection.

The distal tapered section may taper inwardly at an angle of between 5 degrees and 20 degrees. Thus, the distal tapered section tapers inwardly at an angle which results in a thermally efficient pipe junction. The distal tapered section may be connected to the first connection portion by a weld. Advantageously, an angle of between 5 degrees and 20 degrees ensures a strong weld is formed between the distal tapered section and the first connection portion. Penetration of the weld material into the joint is important for a strong weld. In addition, a bend in the outer pipe wall will modify the material properties. An angle of taper between 5 degrees and 20 degrees ensures the material properties are not modified so much as to endanger the integrity of the outer pipe wall at the point of taper.

BRIEF DESCRIPTION OF THE DRAWINGS

Embodiments of the invention are further described hereinafter with reference to the accompanying drawings, in which.

DETAILED DESCRIPTION

Improved junctions between a pipe and a further pipe may be realised when the shape of the end of the pipe can be altered to suit the environment in which the pipe is situated. Such shapes form the foundation of the present disclosure.

Figure 1:
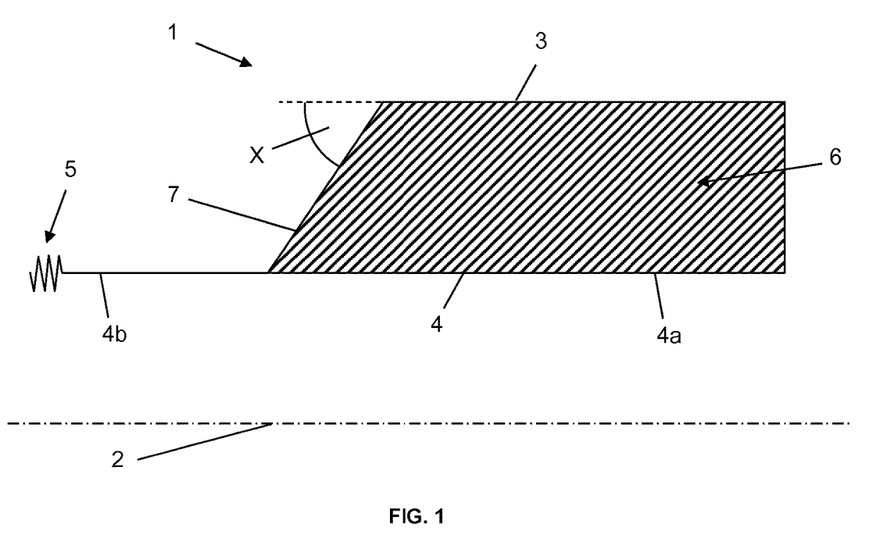
FIG. 1 is an illustration of an example of an end of a single pipe, viewed as a profile of revolution.

An illustration of an example of an end portion of a single pipe, viewed as a profile of revolution, is shown in FIG. 1. The illustration in FIG. 1 is not a scale diagram. A thermally insulated pipe 1 is shown as a profile of revolution about an axis of revolution 2. The fully formed thermally insulated pipe 1 comprises an outer pipe wall 3 which surrounds an inner pipe wall 4 which acts as a barrier to prevent fluid escaping from the pipe. The inner pipe wall 4 is substantially parallel to the outer pipe wall 3. The inner pipe wall 4 comprises a body portion 4a and a connection portion 4b. A layer of thermal insulation 6 is provided between the outer pipe wall 3 and the body portion 4a of the inner pipe wall 4, such that the connection portion 4b of the inner pipe wall 4 is not provided with thermal insulation. The layer of thermal insulation 6 may be formed from a micro-porous material. The pipe 1 also comprises a male joinable end comprising the connection portion 4b of the inner pipe wall 4 which terminates in a connection component 5 which is adapted to engage a connection component of a further pipe. In this particular example, the connection component is a screw connection 5. The male joinable end also comprises a transition region 7 where the outer pipe wall 3 tapers continuously inwardly to meet the connection portion 4b of the inner pipe wall 4. The pipe may be screwed together using the screw connection 5 to form a robust, durable connection. In this way, an uninterrupted, thermally-insulated fluid path may be provided by connecting together a series of the pipes shown.

The transition region taper angle X is approximately 15 degrees, though taper angles between 5 degrees and 20 degrees are suitable for thermally insulated pipe junctions of this type. The transition region taper angle X is the angle of inward depression of the transition region from the outer pipe wall 3 in the direction from the outer pipe wall 3 towards the male joinable end of the pipe. The pipe may be a cylindrical double-walled pipe. The diameter of the pipe at the inner pipe wall is between 0.051 m and 0.152 m (2 inches and 6 inches). In this particular example, the diameter of the inner pipe wall 4 of the pipe may be 0.089 m (3½ inches). The thickness of the pipe wall is typically 0.051 m (2 inches), so the diameter of the outer pipe wall 3 of the pipe in this particular example would be 0.140 m (5½ inches). The outer pipe wall 3 and the inner pipe wall 4 may be surfaces of one or more layers formed from steel, for instance.

Figure 2:
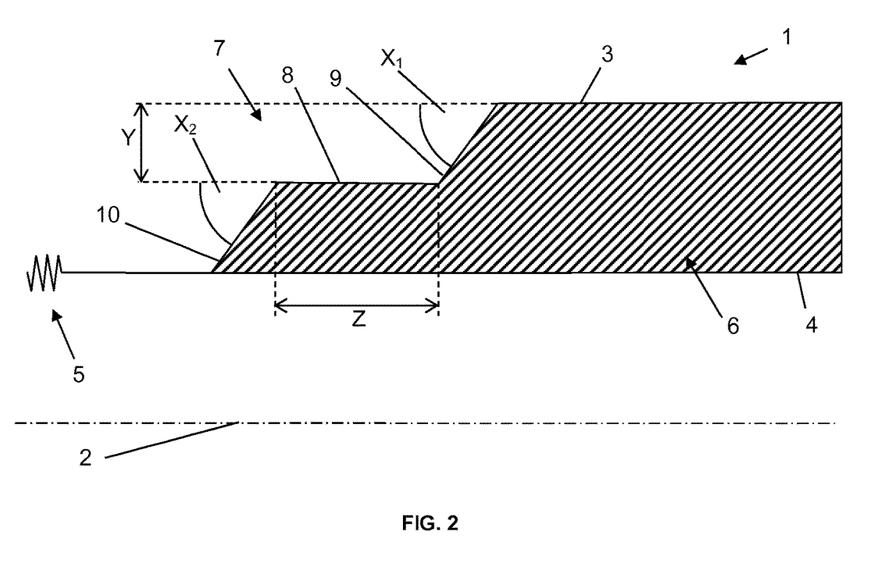
FIG. 2 is an illustration of an example of an end of a further pipe, viewed as a profile of revolution.
Figure 3:
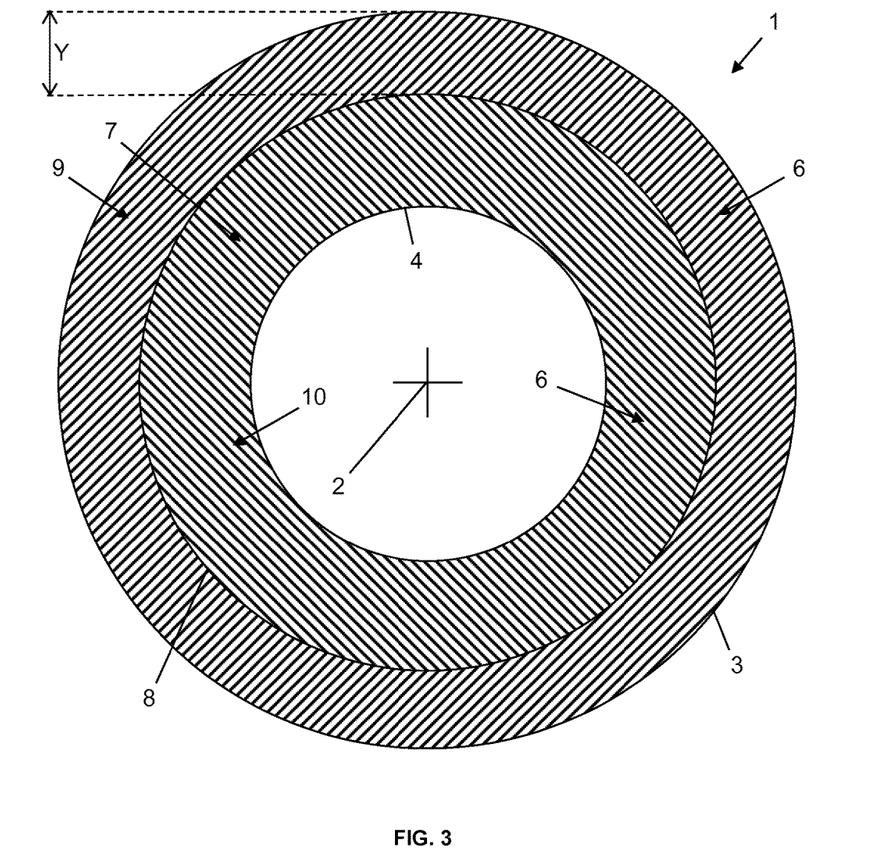
FIG. 3 is an illustration of an example of an end of the pipe of FIG. 2, viewed from the end of the pipe.

Referring now to FIGS. 2 and 3, where FIG. 2 is an illustration of an example of an end of a further pipe section, viewed as a profile of revolution; and FIG. 3 is an illustration of an example of an end of the pipe of FIG. 2, viewed from the end of the pipe. The illustrations in FIGS. 2 and 3 are not a scale diagram. The thermally insulated pipe 1 is substantially as described in reference to FIG. 1, though the transition region 7 in this example is where the outer pipe wall 3 narrows in a stepped manner to meet the connection portion. The outer pipe wall 3 of the transition region 7 comprises a proximal tapered section 9 and a distal tapered section 10. An intervening section 8 is provided between the proximal tapered section 9 and the distal tapered section 10 and is substantially parallel to the inner pipe wall 4. In this particular example, the proximal tapered section 9 has a proximal taper angle $X_1$ of 15 degrees and the distal tapered section 10 has a distal taper angle $X_2$ of 15 degrees. Although the taper is constant across the proximal tapered section 9 and the distal tapered section 10 in the illustration of FIG. 2, the taper angles may vary across the proximal tapered section 9 and the distal tapered section 10. The intervening section 8 forms a substantially cylindrical shape. Although the intervening section 8 is shown untapered in FIG. 2, the intervening section 8 may, instead, have a taper angle. Usually, a taper of the intervening section 8 is less than the taper of the proximal tapered section 9 and the taper of the distal tapered section 10. Intervening section offset Y represents the radial offset of intervening section 8 from the outer pipe wall 3. In the present example, the intervening section offset Y is approximately 3 mm. A smaller intervening section offset Y results in a thicker layer of thermal insulation 6 available to restrict heat loss from the pipe, but also increases material usage, and so fabrication costs for the thermally insulated pipe 1.

Figure 4:
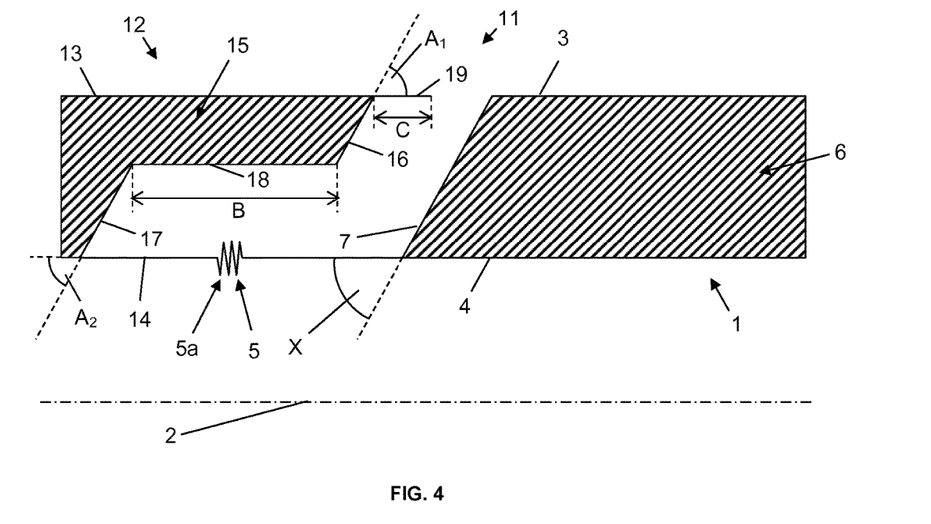
FIG. 4 is an illustration of an example of a junction between two pipes, viewed as a profile of revolution.

An illustration of an example of a junction between two pipes, viewed as a profile of revolution, is shown in FIG. 4. A thermally insulated pipe junction is formed between a thermally insulated pipe 1 and a further thermally insulated pipe 12. The thermally insulated pipe 1 is substantially as described in relation to FIG. 1. The further thermally insulated pipe 12 is a corresponding pipe arranged to connect with thermally insulated pipe 1 using connection component 5. In this particular example, connection component 5 is a screw connection 5.

The thermally insulated pipe 12 comprises an outer pipe wall 13 defining an outside of the thermally insulated pipe 12 and an inner pipe wall 14 substantially parallel to the outer pipe wall 13 and configured to contain a fluid within the pipe. The inner pipe wall 14 comprises a body portion and a connection portion extending therefrom. A layer of thermal insulation 15 is provided between the outer pipe wall 13 and the inner pipe wall 14. The thermal insulation 15 is substantially as described with reference to the thermal insulation 6 illustrated in FIG. 1. The connection portion of the inner pipe wall 14 of the further thermally insulated pipe 12 is part of a female joinable end, arranged to interact with the male joinable end of the thermally insulated pipe 1. The connection portion terminates in a second connection component 5a engaging the connection component 5 of the pipe 1. In this particular example, the connection component is the screw connection 5a. The intermediate surface 18 connects the inner pipe wall 14 to the outer pipe wall 13, in a stepped manner, such that both the outer pipe wall 13 and the intermediate surface 18 extends over the screw connection 5a. The presence of intermediate surface 18 over screw connection 5a provides a layer of insulation over the screw connection 5a and helps prevent damage to the screw connection 5a when the pipe is being connected. The intermediate surface 18 extends over at least a part of the connection portion of the thermally insulated pipe 1 and any of the outer pipe wall 3 of the transition region 7 extending within the intermediate surface 18 is tapered continuously up to the connection portion of the thermally insulated pipe 1.

The thickness of insulation between the intermediate surface 18 and the outer pipe wall 13 is typically small. In this particular example, the distance between the intermediate surface 18 and the outer pipe wall 13 may be 3 mm.

Figure 5:
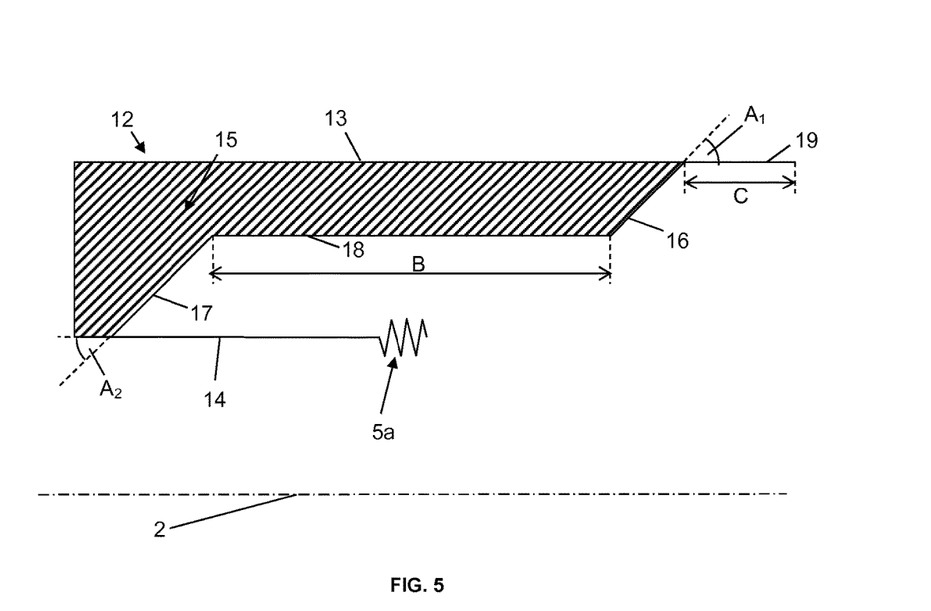
FIG. 5 is an illustration of an example of an end of a pipe suitable for use in the junction of FIG. 4, viewed as a profile of revolution.

The outer pipe wall 13 is connected to the intermediate surface 18 by the first tapered surface 16. The first tapered surface 16 has a first taper angle $A_1$ of 15 degrees. The intermediate surface length B is typically between 0.305 m and 0.610 m (1 and 2 foot). The intermediate surface 18 is connected to the inner pipe wall 14 by the second tapered surface 17. The second tapered surface 17 has a second taper angle $A_2$ of 15 degrees. Both the first taper angle $A_1$ and the second taper angle $A_2$ may be any angle in the range 5 degrees to 20 degrees. The thermally insulated pipe 12 further comprises an outer pipe wall protrusion 19 which extends beyond the end of the outer pipe wall 13. The length C of the outer pipe wall protrusion 19 is typically between 0.015 m and 0.5 m. The thermally insulated pipe 1 is connected to the further thermally insulated pipe 12 to form a thermally insulated pipe junction 11. The distance between the outer pipe wall 3 of the first pipe 1 and the outer pipe wall protrusion 19 of the further pipe 12 is approximately 0.025 m (1 inch). This distance is kept reasonably small to prevent excess heat loss at the thermally insulated pipe junction 11. FIG. 5 is an illustration of an example of an end of a pipe suitable for use in the junction of FIG. 4, viewed as a profile of revolution. The thermally insulated pipe 12 is substantially as described with reference to FIG. 4.

Figure 6:
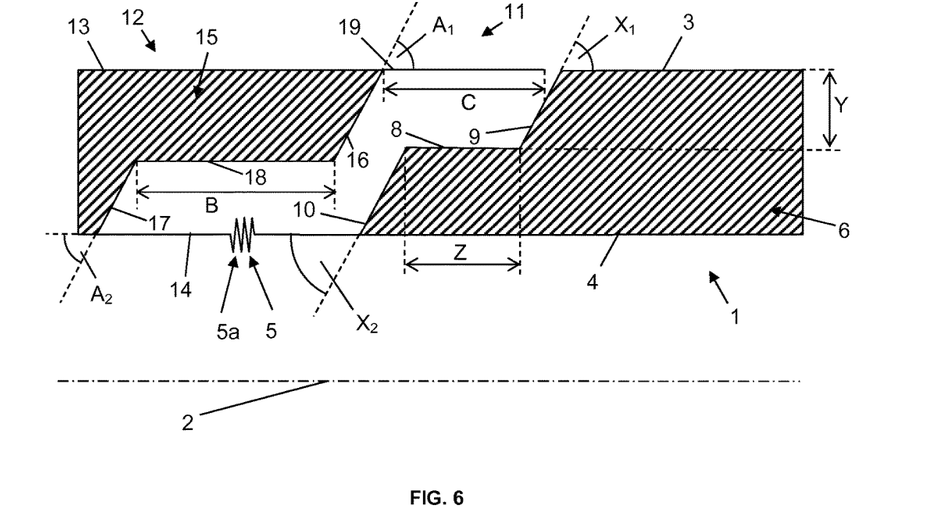
FIG. 6 is an illustration of another example of a junction between two pipes, viewed as a profile of revolution.

FIG. 6 is an illustration of another example of a junction between a first pipe 1 and a second pipe 12, viewed as a profile of revolution. In this particular example thermally insulated pipe junction 11, the thermally insulated pipe 1 as described with reference to FIG. 2 has been connected to the thermally insulated pipe 12 as described with reference to FIG. 5. The perpendicular distance between the intermediate surface 18 and the inner pipe wall 14 of the second pipe is less than the perpendicular distance between the intervening section 8 and the first connection portion of the inner pipe wall 4 of the first pipe. In this particular example, the intermediate section offset Y is less than the thickness of thermal insulation 15 between the intermediate surface 18 and the outer pipe wall 13. Therefore, the intervening section 8 of the thermally insulated pipe section 1 will not fit beneath the intermediate surface 18 of the thermally insulated pipe 12. Therefore, in the thermally insulated pipe junction 11, the clearance between the intermediate surface 18 and the screw connection 5a of the thermally insulated pipe 12 need only allow for the efficient insertion of the screw connection 5 of the thermally insulated pipe 1. This also allows for a smaller overall distance between the inner pipe wall 14 and the outer pipe wall 13 whilst maintaining a fixed distance between the intermediate surface 18 and the outer pipe wall 13 when the distance between the intermediate surface 18 and the inner pipe wall 14 decreases. Even though none of the intervening section 8 extends beneath the intermediate surface 18, at least a part of the intervening section 8 may extend beneath at least a part of the first tapered surface 16 and at least a part of the distal tapered section 10 may extend beneath at least a part of the intermediate surface 18.

For the avoidance of doubt, the distance between the outer pipe wall 3 of the first pipe 1 and the outer pipe wall protrusion 19 of the second pipe 12 is approximately 0.025 m (1 inch). This distance is kept reasonably small to prevent excess heat loss at the thermally insulated pipe junction 11.

In the thermally insulated pipe 1 of FIG. 6, the intervening section 8 which is between the proximal tapered section 9 and the distal tapered section 10 allows a reduced amount of material to be used compared to the example of FIG. 1. Furthermore, this shape is easier to fabricate as each of the proximal tapered section 9 and distal tapered section 10 is smaller than the transition region 7 as described with reference to FIG. 1.

Figure 7:
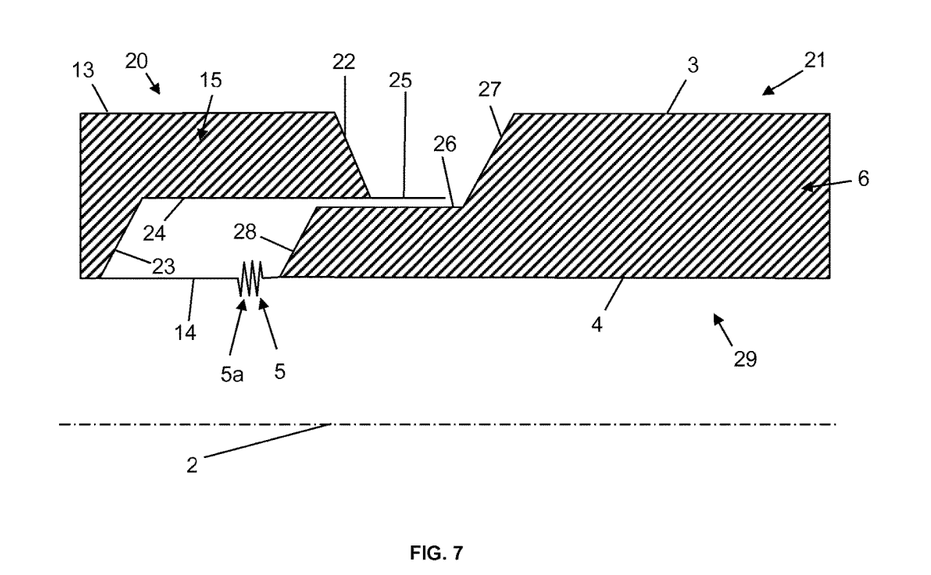
FIG. 7 is an illustration of a further example of a junction between two pipes, viewed as a profile of revolution.

FIG. 7 is an illustration of a further example of a junction between two pipe sections, viewed as a profile of revolution. In this particular example, a female end of a thermally insulated pipe 20 is connected to a male end of a further thermally insulated pipe 21 to form a thermally insulated pipe junction 29. Each thermally insulated pipe 20, 21 comprises an inner pipe wall 14, 4, and outer pipe wall 13, 3, thermal insulation 15, 6 and a screw connection 5a, 5. The thermally insulated pipe 20 further comprises a first tapered surface 22 tapering inwardly from the outer pipe wall 13 to an intermediate surface 24 and a second tapered surface 23 tapering outwardly from the inner pipe wall 14 to the intermediate surface 24. The intermediate surface 24 extends over both the inner pipe wall 14 and the screw connection 5a. An intermediate surface protrusion 25 extends beyond the end of the intermediate surface 24, such that it extends beyond the point at which the first tapered surface 22 meets the intermediate surface 24. The thermally insulated pipe 21 further comprises a first tapered section 27 tapering inwardly from the outer pipe wall 3 to an intermediate section 26 and a second tapered section 28 tapering inwardly from the intermediate section 26 to the inner pipe wall 4. In the thermally insulated pipe junction 29 of the thermally insulated pipe 21, the intermediate section 26 extends beneath the intermediate surface protrusion 25 of the thermally insulated pipe 20. The intermediate section 26 also extends beneath at least a portion of the intermediate surface 24. A length of the intermediate surface protrusion 25 is typically between 15 mm and 500 mm. A distance between a free end of the intermediate surface protrusion 25 and the first tapered section 27, in the direction of the intermediate surface protrusion 25, is approximately 25 mm. This particular thermally insulated pipe junction 29 provides a thermally efficient pipe junction.

Therefore, there is provided a thermally insulated pipe 1 for transporting fluids, being connectable to at least one further pipe. The pipe comprises an outer pipe wall 3 defining an outside of the pipe and an inner pipe wall 4 substantially parallel to the outer pipe wall 3 and configured to contain a fluid within the pipe. The inner pipe wall 4 comprises a body portion and a connection portion extending therefrom, a thermal insulation layer 6 provided between the outer pipe wall 3 and the body portion of the inner pipe wall 4, and at least one male joinable end. The male joinable end comprises the connection portion of the inner pipe wall which terminates in a connection component 5 adapted to engage a connection component of a further pipe, and a transition region 7 where the outer pipe wall 3 tapers continuously inwardly to meet the connection portion of the inner pipe wall 4.

Therefore, a pipe, providing a fluid path, can be formed from several pipe sections using connections formed by the pipe connection component of a female joining end joining to a corresponding pipe connection component of a male joining end as described in the present disclosure. In some examples, each pipe section has a male joining end and a corresponding female joining end provided at an opposite end of the pipe section, such that any one pipe section may be joined end-to-end with any other pipe section. Alternatively, it is possible that a pipe section has two male pipe connection components provided at opposite ends of the pipe section. A further pipe section may have two female pipe connection components provided at opposite ends of the further pipe section. In order to construct a longer pipe, either end of the pipe section may be joined to either end of the further pipe section.

Although the example thermally insulated pipes as described with reference to FIG. 1 to FIG. 7 show various tapered sections, it will be appreciated that these figures are not to scale, and the angles of any of the tapers may be different from the angles illustrated in the figures. Although the tapers in the figures all appear to be of the same taper angle, this need not be so in all cases. In some cases, one or more of the tapers may even be provided in the opposite sense without substantially affecting the advantages of the example pipe section or the example pipe junction. In some further examples, the taper angle may vary along the tapered sections. In each tapered section, the tapering may be uniform or non-uniform Although the presently described pipe examples have used a screw connection as the connection component, it will be appreciated that alternative connection types may be used to form the connection component.

Although the presently described examples disclose the layer of thermal insulation is formed from a micro-porous material, the thermal insulation may instead be formed from multiple layers, for example layers of reflective sheets in a vacuum. Alternative ways of forming the thermal insulation will be apparent to one of ordinary skill in the art.

Although the presence of the axis of revolution in FIGS. 1, 2 and 4 to 7 and the shape of the pipe in FIG. 3 implies a circular pipe cross-sectional shape, it will be appreciated that pipes of alternative shapes can also take advantage of at least some of the technical features of the presently described example pipe sections and example pipe junctions.

Throughout the description and claims of this specification, the word "fluid" means any gas or liquid. In particular, the fluid may be any combination of hydrocarbons and water.

Throughout the description and claims of this specification, the words "comprise" and "contain" and variations of them mean "including but not limited to", and they are not intended to (and do not) exclude other additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A thermally insulated pipe junction comprising a first pipe having a male joinable end and a second pipe having a female joinable end, the first pipe comprising:
   a first outer pipe wall;
   a first inner pipe wall substantially parallel to the outer pipe wall and configured to contain a fluid within the pipe; the first inner pipe wall comprising a first body portion and a first connection portion extending therefrom;
   a first thermal insulation layer provided between the first outer pipe wall and the first body portion;
   the male joinable end comprising:
      the first connection portion which terminates in a first connection component, and
      a transition region where the first outer pipe wall tapers inwardly to meet the first connection portion of inner pipe wall;
   and the second pipe comprising:
   a second outer pipe wall;
   a second inner pipe wall substantially parallel to the second outer pipe wall and configured to contain a fluid within the pipe; the second inner pipe wall comprising a second body portion and a second connection portion extending therefrom;
   a second thermal insulation layer provided between the second outer pipe wall and the second body portion;
   the female joinable end comprising:
      the second connection portion which terminates in a second connection component engaging the first connection component, and
      an intermediate surface connecting the second inner pipe wall to the second outer pipe wall such that both the second outer pipe wall and the intermediate surface extend over the second connection component;
   wherein, the intermediate surface extends over at least a part of the first connection portion and wherein any of the first outer pipe wall of the transition region extending within the intermediate surface is tapered continuously towards the first connection portion.

2. The thermally insulated pipe junction of claim 1, wherein at least one of the transition region, the proximal tapered section and the distal tapered section tapers inwardly at an angle of between 5 degrees and 20 degrees.

3. The thermally insulated pipe junction of claim 1, wherein the first connection component is a screw connection.

4. A thermally insulated pipe junction comprising a first pipe having a male joinable end and a -second pipe having a female joinable end, the first pipe comprising:
   a first outer pipe wall;
   a first inner pipe wall substantially parallel to the outer pipe wall and configured to contain a fluid within the pipe; the first inner pipe wall comprising a first body portion and a first connection portion extending therefrom;
   a first thermal insulation layer provided between the first outer pipe wall and the first body portion;
   the male joinable end comprising:
      the first connection portion which terminates in a first connection component, and
      a transition region where the first outer pipe wall narrows in a stepped manner to meet the first connection portion, the outer pipe wall of the transition region comprising a proximal tapered section, a distal tapered section and an intervening section there between, the intervening section being substantially parallel to the first inner pipe wall;
   and the second pipe comprising:
      a second outer pipe wall;
      a second inner pipe wall substantially parallel to the second outer pipe wall and configured to contain a fluid within the pipe; the second inner pipe wall comprising a second body portion and a second connection portion extending therefrom;
      a second thermal insulation layer provided between the second outer pipe wall and the second body portion;
   the female joinable end comprising:
      the second connection portion which terminates in a second connection engaging the first connection component, and
      an intermediate surface connecting the second inner pipe wall to the second outer pipe wall such that both the second outer pipe wall and the intermediate surface extend over the second connection component;
   wherein the intermediate surface is connected to the second outer pipe wall by a first tapered surface and the intermediate surface is connected to the second inner pipe wall by a second tapered surface;
   wherein the perpendicular distance between the intermediate surface and the second inner pipe wall is less than the perpendicular distance between the intervening section of the first outer pipe wall and the first connection portion.

5. The thermally insulated pipe junction of claim 4, wherein at least one of the transition region, the proximal tapered section and the distal tapered section tapers inwardly at an angle of between 5 degrees and 20 degrees.

6. The thermally insulated pipe junction of claim 4, wherein the first connection component is a screw connection.

* * * * *